US00RE44913E

(19) United States
(12) Reissued Patent
Bickerton

(10) Patent Number: US RE44,913 E
(45) Date of Reissued Patent: May 27, 2014

(54) TEXT ENTRY METHOD AND DEVICE THEREFOR

(71) Applicant: Matthew J. Bickerton, Bletchingley (GB)

(72) Inventor: Matthew J. Bickerton, Bletchingley (GB)

(73) Assignee: Koninklijke Philips N.V., Eindhoven (NL)

(21) Appl. No.: 13/955,345

(22) Filed: Jul. 31, 2013

Related U.S. Patent Documents

Reissue of:

(64) Patent No.: 6,885,318
Issued: Apr. 26, 2005
Appl. No.: 10/156,409
Filed: May 28, 2002

(30) Foreign Application Priority Data

Jun. 30, 2001 (GB) ..... 0116083.7

(51) Int. Cl.
*H03K 17/94* (2006.01)
*G06F 15/02* (2006.01)

(52) U.S. Cl.
USPC ..... 341/22; 345/168; 708/145; 708/146; 379/368; 400/486

(58) Field of Classification Search
CPC ..... H03K 17/94; G06F 15/02; G06F 3/0238
USPC ..... 341/20, 22; 345/168; 379/368; 400/486; 708/131, 145, 146
See application file for complete search history.

(56) References Cited

U.S. PATENT DOCUMENTS

| | | | | |
|---|---|---|---|---|
| 3,967,273 | A | 6/1976 | Knowlton | |
| 4,099,246 | A * | 7/1978 | Osborne et al. | 708/146 |
| 4,737,980 | A | 4/1988 | Curtin et al. | |
| 4,999,795 | A | 3/1991 | Lapeyre | |
| 5,124,940 | A | 6/1992 | Lapeyre | |
| 5,128,672 | A | 7/1992 | Kaehler | |
| 5,798,716 | A | 8/1998 | Davis | |
| 5,818,437 | A | 10/1998 | Grover et al. | |
| 5,861,823 | A | 1/1999 | Strauch et al. | |

(Continued)

FOREIGN PATENT DOCUMENTS

| | | |
|---|---|---|
| EP | 0889388 A1 | 7/1999 |
| JP | 4127310 | 4/1992 |

(Continued)

OTHER PUBLICATIONS

TLS2200 Thermal Transfer Printer User's Guide, 2000 Brady Worldwide, Inc. 93 pages.

(Continued)

*Primary Examiner* — Albert Wong

(57) ABSTRACT

A method and device for improved character input are described, wherein the method employs a keypad 100 comprising keys 102 able to display secondary characters 106 in addition to primary characters 104. The keypad has a default display state. A first key selection causes the keypad 100 to display secondary characters 106 associated with the first key on other keys 102, whereupon a second key selection causes the displayed character to be input, following which the keypad reverts to displaying the default state. Further secondary characters 200 may also be displayed after a first key selection. The method is particularly useful for handheld devices such as mobile radio telephones or handheld computers adapted to implement the method of the invention.

16 Claims, 6 Drawing Sheets

(56) References Cited

U.S. PATENT DOCUMENTS

| | | | | |
|---|---|---|---|---|
| 5,952,942 | A * | 9/1999 | Balakrishnan et al. | 341/20 |
| 5,952,952 | A | 9/1999 | Choi et al. | |
| 5,956,021 | A | 9/1999 | Kubota et al. | |
| 6,009,444 | A | 12/1999 | Chen | |
| 6,016,142 | A | 1/2000 | Chang et al. | |
| 6,016,538 | A | 1/2000 | Guttag et al. | |
| 6,043,760 | A | 3/2000 | Laakkonen | |
| 6,130,628 | A | 10/2000 | Schneider-Hufschmidt et al. | |
| 6,169,538 | B1 | 1/2001 | Nowlan et al. | |
| 6,271,835 | B1 | 8/2001 | Hoeksma | |
| 6,295,052 | B1 | 9/2001 | Kato et al. | |
| 6,359,572 | B1 | 3/2002 | Vale | |
| 6,473,006 | B1 | 10/2002 | Yu et al. | |
| 6,686,902 | B2 | 2/2004 | Lee | |

FOREIGN PATENT DOCUMENTS

| | | | | |
|---|---|---|---|---|
| JP | 07200120 | A | 8/1995 | |
| JP | 0934891 | A | 2/1997 | |
| JP | 2000172417 | A | 6/2000 | |
| JP | 2001125720 | A | 5/2001 | |
| JP | 4019512 | A | 10/2007 | |
| JP | 04999794 | B2 | 8/2012 | |
| WO | 200214996 | A1 | 2/2002 | |
| WO | WO 0214996 | | 2/2002 | G06F 3/00 |

OTHER PUBLICATIONS

Masui, "An Efficient Text Input Method for Pen-Based Computers", Proceedings of the ACM Conference on Human Factors in Computing System, Apr. 1998, p. 328-335.

Patent Abstracts of Japan, Ono Katsuyasu: "Adjacent Character Display Keyboard," Publication No. 07200120, Apr. 8, 1995, Application No. 05355185, Dec. 28, 1993.

* cited by examiner

TEXT ENTRY METHOD AND DEVICE THEREFOR

Matter enclosed in heavy brackets [ ] appears in the original patent but forms no part of this reissue specification; matter printed in italics indicates the additions made by reissue.

*This application claims the benefit or priority of and describes the relationships between the following applications: wherein this application is a reissue of U.S. Pat. No. 6,885,318, issued Apr. 26, 2005, from U.S. patent application Ser. No. 10/156,409, filed May 28, 2002, which claims priority of foreign application GB 0116083.7 filed Jun. 30, 2001, all of which are incorporated herein in whole by reference.*

The present invention relates to a method of entering text into a device, and to a device such as a portable radio telephone or a handheld computer suitably adapted to implement said method.

Portable radio telephone, or "mobile phone", ownership during recent years has been well documented and reported world-wide. Whilst mobile phone networks such as the Global System for Mobile communications (GSM) were originally designed for voice traffic, the sending of text messages using a Short Messaging Service (SMS) via suitably equipped phones has risen dramatically over the past couple of years, with the number of SMS messages sent world-wide on the GSM networks reaching fifteen billion in December 2000. This is in part due to the critical mass of ownership now reached in developed countries and also due to the low and typically fixed costs of sending a text message when compared with a voice call. The popularity of text messaging is also explained by the private and often intimate communication path offered by a text message. The numbers of text messages sent and received by users are forecast to increase even further with the impending introduction of more advanced, so-called 3G (third generation) wireless networks and services, where data, fax and more advanced e-mail services will be available on a 3G mobile phone or suitably equipped handheld computer or personal digital assistant (PDA).

A known method of entering text into devices such as mobile phones involves a user pressing a key on a keypad several times to cycle through characters associated with the key, until the character required is selected. For example, the number "2" key is associated with the characters "abc", the "3" key with the characters "def", the "4" key with the characters "ghi", the "5" key with "jkl" and so on. To select the character "a", the "2" key is pressed once. To select the character "b" the "2" key is press twice. The character "1" is selected by pressing the "5" key three times and so forth. Special characters (for example full stop, exclamation mark, double quote, dollar, percent, ampersand and star) are produced by tapping the one or zero keys several times until the required special character is selected. This method of entering text, commonly referred to as the "multitap" method is at present almost ubiquitous on mobile phones due to agreed standardisation between mobile phone manufacturers and service providers. Users are therefore very familiar with the multitap keypad layout and character association. However, this method often requires more than two key taps to select a character, and the entering of special characters can take many key taps. The method is therefore slow and prone to error.

An alternative method of inputting text to a device is disclosed in U.S. Pat. No. 5,128,672 wherein the device comprises a dynamic predictive keyboard which is graphically represented on a touch sensitive display. A user inputs a character by pressing a key with the required character displayed on it. Following a character input, software provided within the device formulates a prediction, based on statistical analysis of the make-up and composition of English words of the next most likely character required by the user and consequently the layout of the keyboard is altered such that said most likely character is displayed on the keyboard. This has the problem that the keyboard does not resemble the multitap keypad familiar to mobile phone users, thereby presenting an unfamiliar interface to the average user. This problem is further compounded since in use the constant changing of the keyboard layout necessitates much practice and learning for proficient and quick text entry. Furthermore, the access and input of special characters is a problem unsolved by the predictive means of U.S. Pat. No. 5,128,672.

It is therefore an aim of the present invention to provide an improved method of entering characters into a device such as a mobile phone or handheld computer. It is a further aim of the present invention to provide a method consistent with a keypad with which mobile phone users are familiar.

According to a first aspect of the present invention there is provided a method for inputting a character to a device, the device comprising a keypad, the keypad comprising a plurality of keys, at least one of which keys has a primary character, a plurality of secondary characters and a display area associated with it, the keypad in a default state displaying the primary character associated with a key in its respective display area, wherein the method comprises the steps of: detecting a first key selection; displaying each of the secondary characters associated with the first selected key in a respective display area; detecting a second key selection; selecting for input the secondary character associated with the second key selection; and returning the keypad to the default state.

According to a second aspect of the present invention there is provided a device for receiving character input, comprising a keypad having a plurality of keys, a key having a primary character, a plurality of secondary characters and a display area associated with it, wherein means are provided for displaying in a default state the primary character associated with a key in its respective display area, means responsive to a first key selection are provided for displaying each of the secondary characters associated with the selected key in a respective display area, and means responsive to a second key selection are provided for selecting as input character the secondary character associated with the second key selected and for returning the keypad to its default state.

The device and method of this invention comprise a keypad having a default display state wherein primary, and optionally secondary, characters are displayed. A user inputs a character by selecting the key having that character as one of its associated secondary characters, following which the keypad displays the required character which is then input via an appropriate second key selection.

In one embodiment of the present invention the keypad is displayed on a touch screen, the touchscreen having an output area for displaying characters input by the user. In this embodiment the display area associated with a key is provided by an area of touchscreen within or adjacent to the graphical representation of the key or button.

In another embodiment of the present invention the associated display area of a key is provided by display means such as a liquid crystal display within or adjacent to the key or button. The display means are arranged such that a displayed character is visible to the user, and hence character association with the key is rendered obvious to the user.

The method and device of this invention provide improved text entry particularly suited to, but not exclusively for, hand held devices such as portable mobile radio telephones, personal digital assistants, pocket computers and remote control handsets.

Embodiments of the present invention will now be described, by way of example only, with reference to the accompanying figures in which.

In the figures the same reference numerals have been used to indicate corresponding features.

Figure 1:
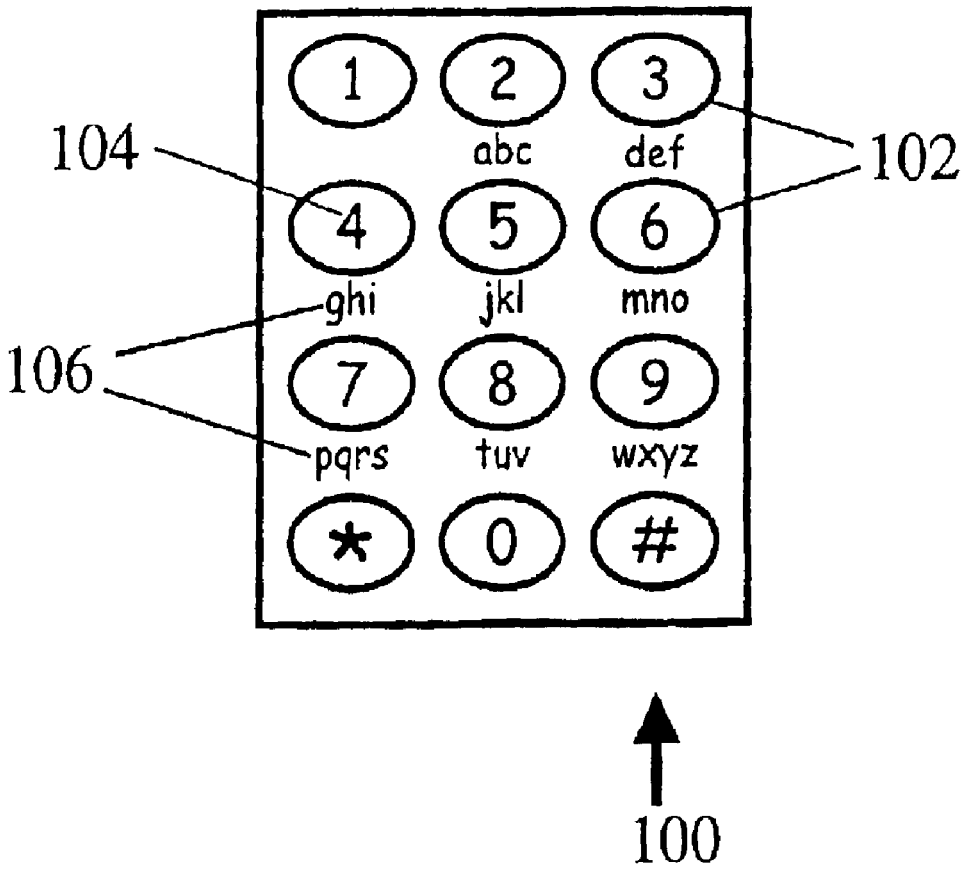
FIG. 1 depicts a default display state of a keypad for use with the present invention.

FIG. 1 depicts a keypad 100 in a default display state wherein twelve keys 102 are arranged in four rows of three keys. Each key has a primary character 104 and a plurality of secondary characters 106 associated with it. The primary character 104 displayed on each key 102 is, in this embodiment, selected from the group of characters 1, 2, 3, 4, 5, 6, 7, 8, 9, 0, # and *. The secondary characters 106 associated with each key are shown in groups adjacent the respective key. The secondary character groupings in this embodiment are similar to those of the multitap method, for example the key associated with primary character "2" has an associated secondary character grouping "abc", the key "3" the associated secondary characters "def" and so on as shown in the figure. Hence, the default display state of the keypad 100 as shown in FIG. 1 presents to the user a keypad having a well known key and character layout, thereby necessitating little or no familiarisation.

Figure 2:
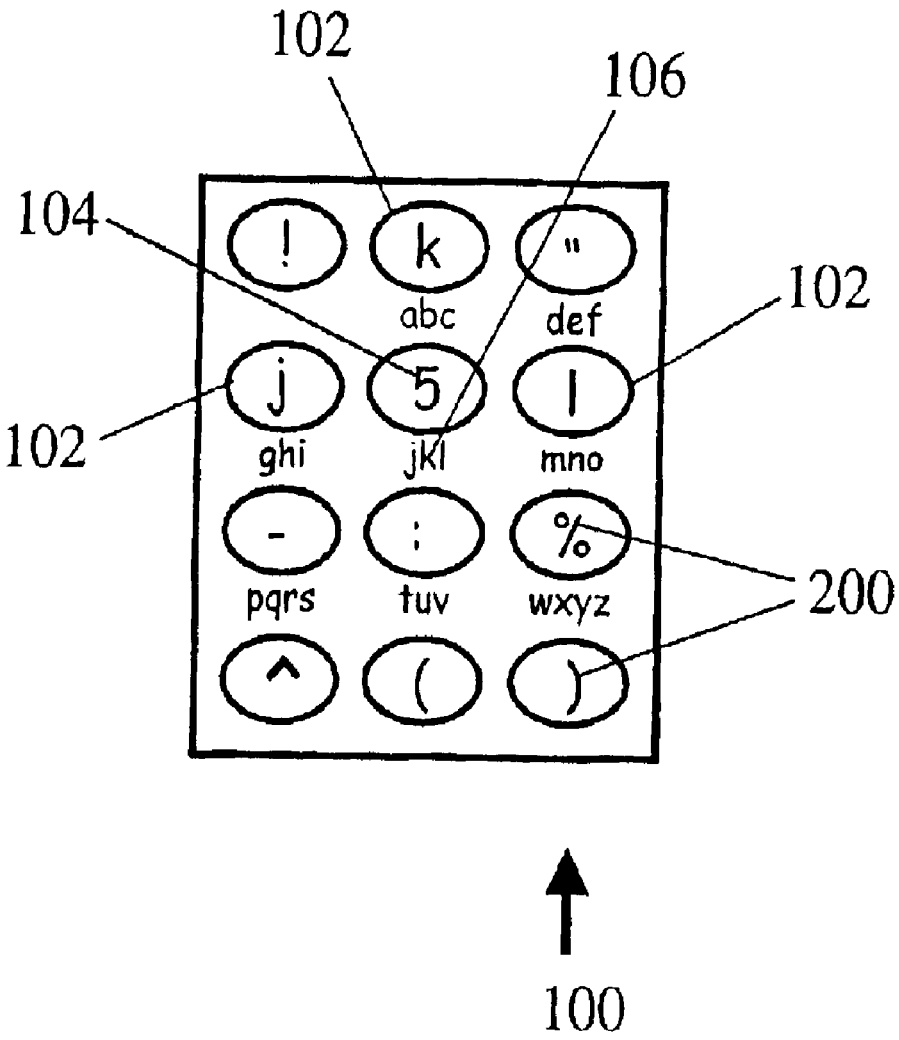
FIG. 2 illustrates an example of the characters displayed on the keypad after a first key selection.

FIG. 2 illustrates a possible display state of the keypad 100 after a first key selection by a user, the selected key in this example being the "5" key (the key associated with the primary character "5" and secondary characters "jkl"). The secondary character "j" is displayed by the display area associated with a neighbouring key, in this example the key associated with the primary character "4" adjacent the "5" key. Similarly, the secondary characters "k" and "l", associated with the first key selection, are displayed respectively on the keys previously displaying "2" and "6" as primary characters. In this example the remaining keys have displayed upon them further characters 200 which are useful for text entry. For example characters representing an exclamation mark, a double quote, a pound, a dollar sign, left and right brackets, a percentage symbol and a caret may be displayed as shown in FIG. 2.

A second key selection from the keypad of FIG. 2 selects the character displayed on the display area associated with said second key for input. Following a character input, the keypad of FIG. 2 is returned to the default display state as shown in FIG. 1.

The key selections are typically provided by a user's finger or stylus and may comprise the user tapping a first key followed by the user tapping a second key. Alternatively, the user may make a second key selection by sliding or dragging said finger or stylus across the keypad from the first key to the second key and pausing on, or removing the finger or stylus from, the required second key.

The dynamic keypad states illustrated in FIG. 1 and FIG. 2 provide a method of quick and accurate character input wherein secondary characters are available with only two key selections. Additionally the method is intuitive and requires little or no learning by the user due to the provision of a familiar default keypad display state.

Figure 3:
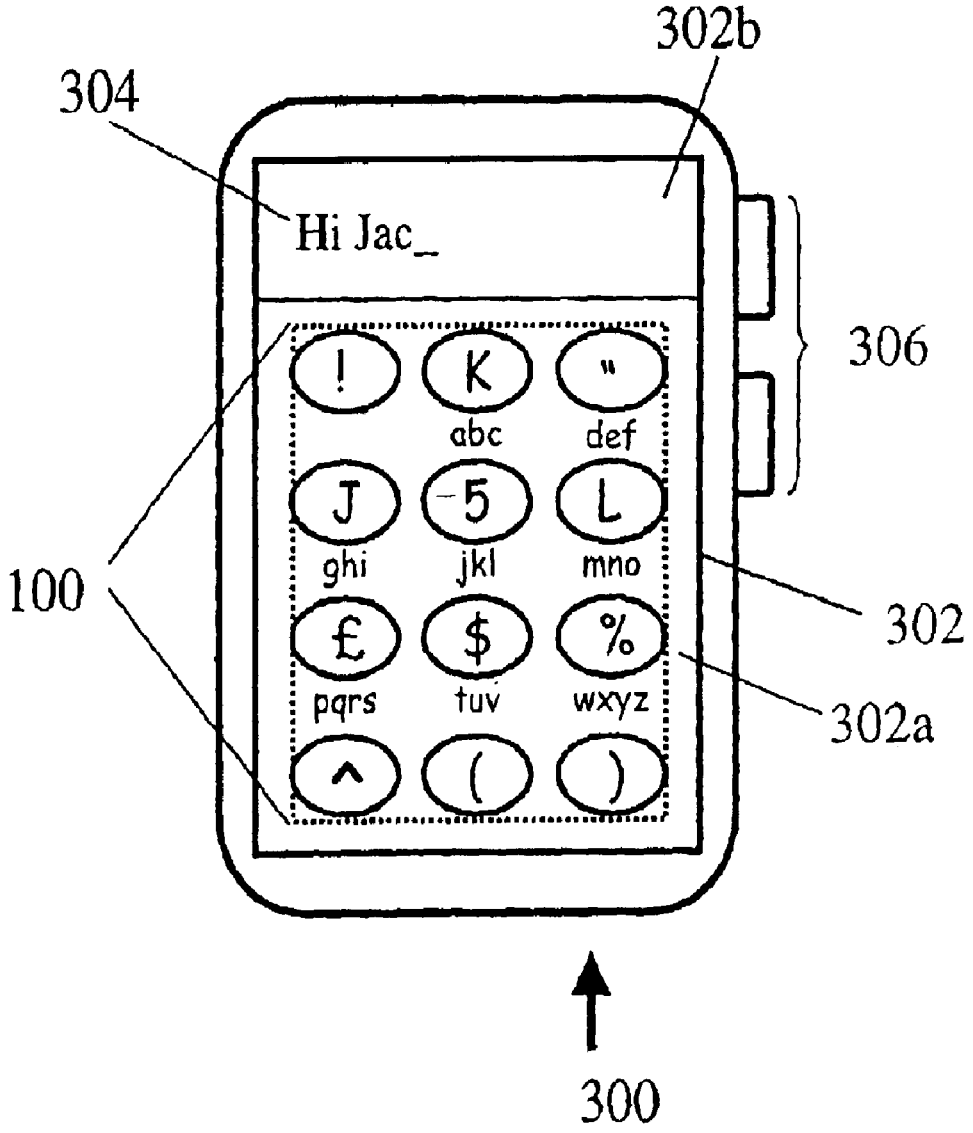
FIG. 3 depicts an example of a device made in accordance with the present invention.

An embodiment of a device employing the keypad and features of this method and made in accordance with the present invention is shown in FIG. 3. The figure depicts a hand-held device 300 such as a personal digital assistant (PDA) or sometimes called a handheld computer. The device comprises a touchscreen 302 comprising touch input means arranged to detect touch input upon a surface of a display means (such as a liquid crystal or organic light emitting diode display). The touchscreen in this embodiment displays a keypad 100 to the user within a touch input region 302a of the touchscreen, whilst input characters 304 are displayed in an output region 302b of the touchscreen 302. In FIG. 3 the keypad 100 is shown in the second display state of FIG. 2, wherein a first key selection of the key "5" has occurred and the keypad awaits a second key selection to input a character. The device further comprises control buttons 306 provided to power up the device or change mode of usage for example. Additionally the handheld device may incorporate means (not shown on FIG. 3) to transmit and receive data including voice and text messaging wirelessly via a suitable network.

Figure 4:
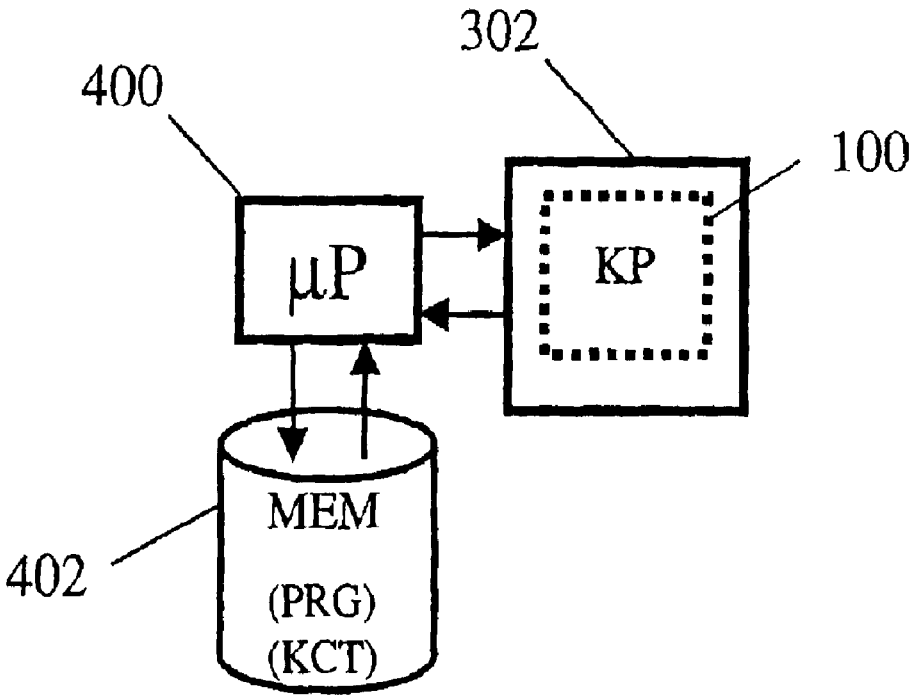
FIG. 4 is a schematic diagram of components of the device of FIG. 3.

The device 300 further comprises components adapted for carrying out a method in accordance with the present invention, these components being schematically represented in FIG. 4. The relevant components comprise a computer program (PRG) and processing means in the form of a general purpose microprocessor 400 (μP). The computer program is stored in computer readable storage media 402 (MEM), the PRG comprising instructions to instruct the microprocessor (μP) 400 to carry out the steps of a method according to the present invention. It is noted herewith that although the processing means of this embodiment comprise a general purpose microprocessor, other suitable forms of processing means such as dedicated logic circuits, PICmicro® chips or application specific integrated circuits (ASIC) operating with or without a computer program could be employed in alternative embodiments.

In FIG. 4 there is also provided the touchscreen 302, the touchscreen able to display a keypad 100 (KP) and detect touch input for inputting characters. In this embodiment the display area associated with each key 102 of the keypad 100 is provided by an area of touchscreen 302 within or adjacent to the graphical representation of the key 102. p Additionally, one or more key character tables (KCT) are provided within MEM 402. A KCT provides information to the microprocessor relating to the default keypad to be displayed on the touchscreen, and also provides the primary and secondary characters which are to be displayed upon a first key selection.

An example of a KCT is presented below (Table 1).

TABLE 1

| KEY | PRIMARY CHARACTER | SECONDARY CHARACTER(S) |
|---|---|---|
| 1 | 1 | Not used |
| 2 | 2 | abc |
| 3 | 3 | def |
| 4 | 4 | ghi |
| 5 | 5 | jkl |
| 6 | 6 | mno |
| 7 | 7 | pqrs |

TABLE 1-continued

| KEY | PRIMARY CHARACTER | SECONDARY CHARACTER(S) |
|---|---|---|
| 8 | 8 | tuv |
| 9 | 9 | wxyz |
| 0 | 0 | Not used |
| * | * | Not used |
| # | # | Not used |

Table 1 thereby provides primary and secondary characters to the microprocessor which, under the guidance of PRG instructs the touchscreen to display these characters in the appropriate locations to build up a default keypad display state corresponding to FIG. 1 and Table 1.

Similarly a KCT relating to a first key selection of key 5 is shown below in Table 2.

TABLE 2

| KEY | DISPLAY SECONDARY CHARACTER |
|---|---|
| 1 | ! |
| 2 | k |
| 3 | " |
| 4 | j |
| 5 | 5 |
| 6 | 1 |
| 7 | £ |
| 8 | $ |
| 9 | % |
| 0 | ^ |
| * | ( |
| # | ) |

This KCT provides the characters displayed upon a first key selection corresponding to key 5 thereby providing a second keypad display state as shown in FIG. 2.

In operation, the microprocessor 400, under the guidance of PRG looks up the default key character assignations stored in MEM 402 as a KCT (for example the KCT of Table 1) and instructs the touchscreen 302 to display the keypad 100 in a default display state. The touchscreen is sampled repeatedly until a first key selection is detected, following which the appropriate characters to be displayed are retrieved from an appropriate stored KCT (e.g. Table 2) by the microprocessor and provided to the touchscreen which updates the keypad 100 displayed. Following these operations the touchscreen is sampled repeatedly for a second key selection.

Upon detection of a second key selection the microprocessor 400 compares the key selected with the displayed KCT (Table 2 for example) and returns the input character for display in the output region 302b of the touchscreen 302. Finally, the microprocessor instructs the touchscreen to display the default keypad and awaits further user interaction.

Figure 5:
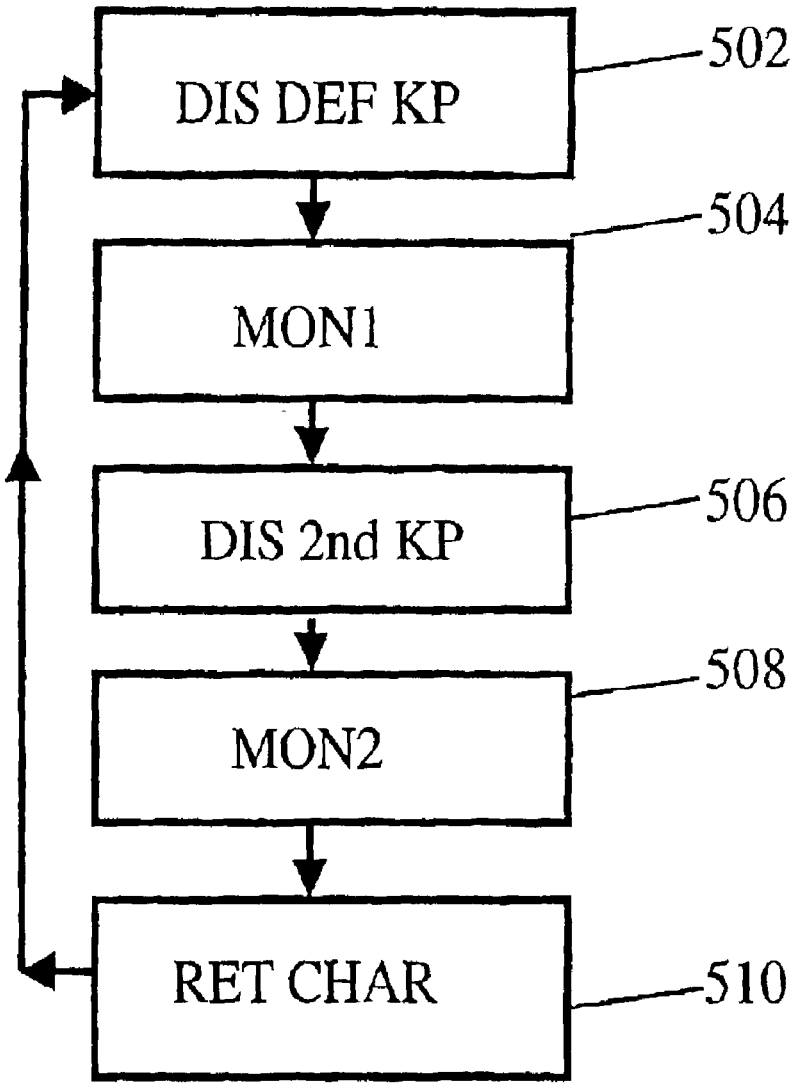
FIG. 5 is a flow diagram illustrating a basic implementation of a method according to the present invention.

A flow diagram illustrating the main steps of this method is presented in FIG. 5, the method being performed as a loop, wherein:

A default keypad is displayed (DIS DEF KP) 502

The keypad is monitored for a first key selection (MON1) 504

Following a first key selection the appropriate characters are displayed on the keypad (DIS $2^{nd}$ KP) 506

The keypad is monitored for a second key selection (MON2) 508

Following a second key selection the secondary character associated with the second key selection is returned as an input character (RET CHAR) 510

Loop back to display the default keypad (DIS DEF KP) 502

In a further embodiment, the first key selection is reported only after the key is selected by a user for a pre-determined time period, for example a time period of 0.2 seconds. This enables quick tapping to select the default primary characters displayed on a default keypad, thereby allowing fast number entry when required without altering the keypad display state.

According to a further embodiment of this invention, the display of primary or secondary characters associated with a key is achieved by providing an associated display area within, on or situated adjacent to the key. The default assigned secondary characters are provided adjacent to the keys on the keypad, and the user presses the keys to input characters in accordance with a method of this invention.

Figure 6:
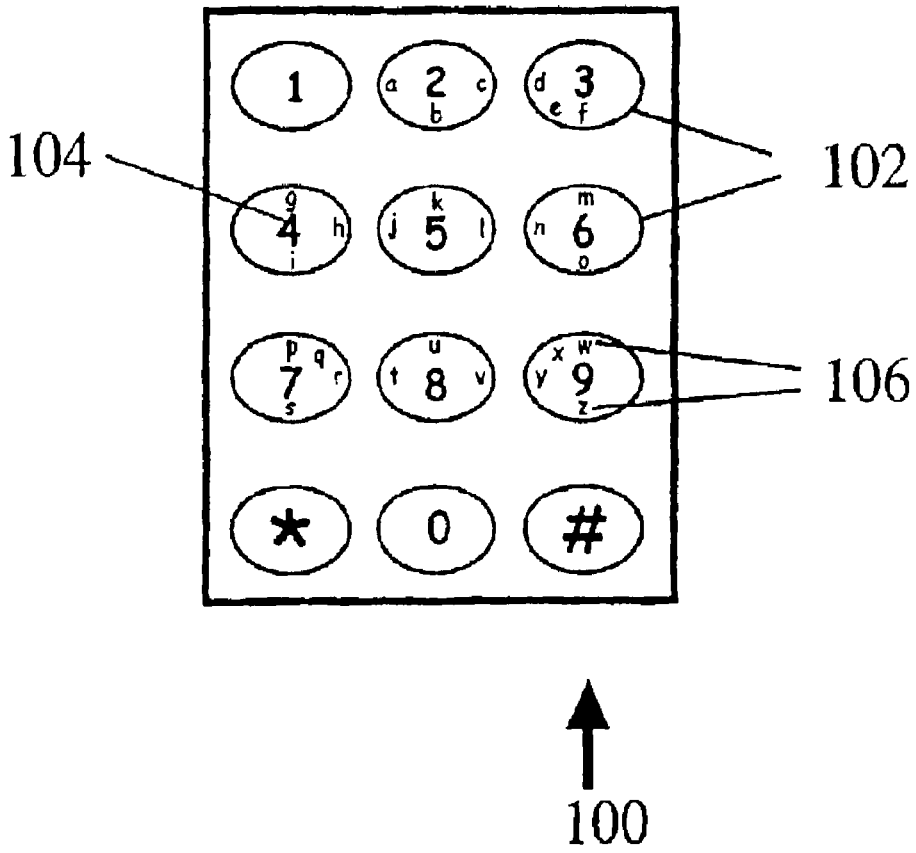
FIG. 6 depicts an alternative default display state of a keypad for use with the present invention.

In a further embodiment of this invention, the default display state of the keypad comprises positioning some of the secondary characters associated with a key such that the key display area upon which a secondary character will be displayed next is indicated to the user. An example of a keypad default display state according to this embodiment is given in FIG. 6 wherein secondary characters are displayed within a key, each secondary character being positioned relative to the key upon which it will appear following a first key selection. For example, the key displaying the primary character "5" has the secondary characters "j", "k" and "l" positioned to the left, above and right of the "5" respectively. Hence a visual indication of the key upon which each character will appear should the "5" be first selected is provided to the user. In this example the default display state provides an indication that the "j" will appear on the "4" key to the left of the "5" key, as is shown in the example of the keypad in FIG. 2.

In yet a further embodiment of this invention, one or more of the key character tables are alterable, thereby providing a user with the option of customising the keypad to his or her preference.

Whilst the embodiments described hereinbefore apply this invention to handheld devices such as PDAs and mobile phones, it will be apparent to those skilled in the art that the teaching of this invention may also be applied to advantage to devices wherever character input is required, such as remote control handsets or children's learning aids and toys.

Additionally, the characters assigned as primary and or secondary characters may be any characters convenient for the device, language and application chosen, and the keypad may comprise more or less keys displaying more or less characters than those illustrated herein without departing from the spirit and scope of this invention.

What is claimed is:

1. A method for inputting a character to a device, the device [comprising] *including* a keypad, the keypad [comprising] *including* a plurality of keys, at least one of [which] *the* keys has a primary character, a plurality of secondary characters and [a] *an associated* display area [associated with it], the keypad in a default state displaying the primary character associated with [a] *the at least one* key in [its respective] *the associated* display area, [wherein] the method [comprises the steps] *comprising acts* of:

*in the default state,*

*returning the primary character as an input character in response to selection of the at least one key for a period shorter than a predetermined time period;*

*switching to a second state after* detecting a first key selection *of the at least one key for a period longer than the predetermined time period*;

*in the second state* displaying each of the secondary characters associated with the first selected key in a respective display area;

detecting a second key selection;

selecting for *the* input *character* the secondary character associated with the second key selection; and returning the keypad to the default state.

2. [A] *The* method according to claim 1, [wherein the keypad in a default state] further [displays] *comprising an act of displaying by the keypad in the default state* associated secondary characters adjacent the primary character, the location of each secondary character providing an indication of which display area will display that secondary character following a first key selection.

3. A computer program product stored on a computer readable *non-transitory* medium [for performing all of the steps of claim 1] *that* when [the program is] run on a device for receiving character input *including a keypad, the keypad including a plurality of keys, at least one of the keys having a primary character, a plurality of secondary characters and an associated display area, the keypad in a default state displaying the primary character associated with the at least one key in the associated display area, performs acts of:*

*in the default state,*

*returning the primary character as an input character in response to selection of the at least one key for a period shorter than a predetermined time period;*

*switching to a second state after detecting a first key selection of the at least one key for a period longer than the predetermined time period;*

*in the second state,*

*displaying each of the secondary characters associated with the first selected key in a respective display area;*

*detecting a second key selection;*

*selecting for the input character the secondary character associated with the second key selection; and*

*returning the keypad to the default state.*

4. A device for receiving character input, comprising*:* a keypad having a plurality of keys, at least one of which keys has a primary character, a plurality of secondary characters and [a] *an associated* display area [associated with it, wherein]*:* means [are provided] for displaying in a default state the primary character associated with [a] *the at least one* key in [its respective] *the associated* display area[.]*;*

*in the default state,*

*means for returning the primary character as an input character in response to selection of the at least one key for a period shorter than a predetermined time period;* means *for switching to a second state* responsive to a first key selection [are provided] *of the at least one key for a period longer than the predetermined time period;*

*in the second state,*

*means* for displaying each of the secondary characters associated with the selected key in a respective display area[, and]*;* means responsive to a second key selection [are provided] for selecting as *the* input character the secondary character associated with the second key selection*;* and

*means* for returning the keypad to [its] *the* default state.

5. [A] *The* device as claimed in claim 4, further comprising a touchscreen on which the keypad is displayed and wherein the display area associated with [a] *the at least one* key comprises a respective portion of the touchscreen.

6. [A] *The* device as claimed in claim 4, [wherein] *comprising a display means within the key for displaying* the display area associated with [a] *the at least one* key [is provided by display means within the key].

7. [A] *The* device as claimed in claim 4, [wherein] *comprising a display means adjacent the key for displaying* the display area associated with [a] *the at least one* key [is provided by display means adjacent the key].

*8. The device as claimed in claim 4, wherein the means for switching to a second state comprises a means for detecting a sliding across the keypad from the first key selection to the second key selection.*

*9. The method as claimed in claim 1, the device further including a touchscreen, the method comprising an act of displaying the keypad and the at least one key on the touchscreen.*

*10. The method as claimed in claim 1, the device further including a display within the at least one key, the method comprising an act of displaying the display area associated with the at least one key on the display.*

*11. The method as claimed in claim 1, the device further including a display adjacent the key, the method comprising an act of displaying the display area associated with the at least one key on the display.*

*12. The method according to claim 1, wherein the act of detecting the second key selection comprises an act of detecting a sliding across the keypad from the first key selection to the second key selection.*

*13. The computer program product as claimed in claim 3, the device further including a touchscreen, the method comprising an act of displaying the keypad and the at least one key on the touchscreen.*

*14. The computer program product as claimed in claim 3, the device further including a display within the at least one key, the method comprising an act of displaying the display area associated with the at least one key on the display.*

*15. The computer program product as claimed in claim 3, the device further including a display adjacent the key, the method comprising an act of displaying the display area associated with the at least one key on the display.*

*16. The computer program product as claimed in claim 3, wherein the act of detecting the second key selection comprises an act of detecting a sliding across the keypad from the first key selection to the second key selection.*

* * * * *